United States Patent
Kusanale et al.

(10) Patent No.: US 11,719,021 B2
(45) Date of Patent: Aug. 8, 2023

(54) SENSING AND CONTROL OF ACCESS CONTROL DEVICES

(71) Applicant: Schlage Lock Company LLC, Carmel, IN (US)

(72) Inventors: Vishal S. Kusanale, Bangalore (IN); Avinash K. Vedamurthy, Bangalore (IN); John C. Carpenter, Ingalls, IN (US)

(73) Assignee: Schlage Lock Company LLC, Carmel, IN (US)

( * ) Notice: Subject to any disclaimer, the term of this patent is extended or adjusted under 35 U.S.C. 154(b) by 839 days.

(21) Appl. No.: 16/532,999

(22) Filed: Aug. 6, 2019

(65) Prior Publication Data
US 2021/0040775 A1    Feb. 11, 2021

(51) Int. Cl.
*E05B 47/00* (2006.01)
*H02K 7/06* (2006.01)
(Continued)

(52) U.S. Cl.
CPC ...... *E05B 47/0012* (2013.01); *G07C 9/00571* (2013.01); *H02K 7/06* (2013.01);
(Continued)

(58) Field of Classification Search
CPC ............. Y10T 70/5159; Y10T 70/8946; Y10T 70/0822; Y10T 70/0908; E05B 47/0012;
(Continued)

(56) References Cited

U.S. PATENT DOCUMENTS

| 4,189,712 A | 2/1980 | Lemelson |
| 5,640,862 A | 6/1997 | Remenicky |

(Continued)

FOREIGN PATENT DOCUMENTS

| DE | 19710834 A1 | 11/1997 |
| WO | 2004020769 A1 | 3/2004 |
| WO | 2017009078 A1 | 1/2017 |

OTHER PUBLICATIONS

International Search Report; International Searching Authority; International Patent Application No. PCT/US2020/045196; dated Mar. 4, 2021; 5 pages.
(Continued)

*Primary Examiner* — Kristina R Fulton
*Assistant Examiner* — Steven A Tullia
(74) *Attorney, Agent, or Firm* — Taft Stettinius & Hollister LLP (57) ABSTRACT

An exemplary method generally relates to operating an access control device including a motor, a locking member, and a target component operably connected with the locking member. The motor may be operated to drive the locking member in a first direction from an initial position toward a desired position. When the locking member is blocked from moving beyond a blockage position, a target location of the target component is detected. The motor may then be operated to drive the locking member in a second direction opposite the first direction. The motor may then be operated to drive the locking member in the first direction toward the blockage position while monitoring the location of the target component. As the target component reaches the target location, the motor is supplied with a boost current to drive the locking member beyond the blockage position and toward the desired position.

19 Claims, 8 Drawing Sheets

(51) Int. Cl.
*G07C 9/00* (2020.01)
*E05B 65/10* (2006.01)

(52) U.S. Cl.
CPC ..... *E05B 65/108* (2013.01); *E05B 2047/0016* (2013.01); *E05B 2047/0057* (2013.01); *E05B 2047/0067* (2013.01)

(58) Field of Classification Search
CPC .......... E05B 65/108; E05B 2047/0016; E05B 2047/0057; E05B 2047/0067; G07C 9/00571; H02K 7/06; H02P 29/028
See application file for complete search history.

(56) References Cited

U.S. PATENT DOCUMENTS

| | | | | |
|---|---|---|---|---|
| 6,104,594 | A * | 8/2000 | Frolov | E05B 65/1073 361/139 |
| 7,536,885 | B1 * | 5/2009 | Ross | E05B 65/1073 70/92 |
| 8,182,003 | B2 | 5/2012 | Dye et al. | |
| 8,495,836 | B2 | 7/2013 | Lowder et al. | |
| 9,995,065 | B2 | 6/2018 | Witte et al. | |
| 10,030,426 | B2 | 7/2018 | Langenberg | |
| 10,060,157 | B1 | 8/2018 | Sharp | |
| 10,174,525 | B2 * | 1/2019 | Arlinghaus | E05B 15/004 |
| 10,612,272 | B2 * | 4/2020 | Wu | E05B 47/026 |
| 11,424,061 | B2 * | 8/2022 | Shaffer | H01F 7/064 |
| 2006/0082162 | A1 * | 4/2006 | Escobar | E05B 65/1053 292/201 |
| 2008/0012350 | A1 * | 1/2008 | Condo | E05B 65/1093 292/92 |
| 2008/0048600 | A1 | 2/2008 | Dejohn | |
| 2010/0045053 | A1 * | 2/2010 | Dye | E05B 65/1053 292/201 |
| 2011/0047874 | A1 * | 3/2011 | Lowder | E05B 65/1053 49/31 |
| 2012/0261928 | A1 * | 10/2012 | Dye | E05B 65/1053 292/201 |
| 2014/0109479 | A1 * | 4/2014 | Morstatt | E05B 65/1093 292/144 |
| 2015/0240529 | A1 * | 8/2015 | Dore Vasudevan | E05B 17/0091 70/277 |
| 2015/0247345 | A1 * | 9/2015 | Carpenter | E05B 65/1053 70/277 |
| 2017/0167164 | A1 | 6/2017 | Baty et al. | |
| 2017/0226778 | A1 * | 8/2017 | McKibben | E05B 65/1053 |
| 2017/0321453 | A1 | 11/2017 | Zheng et al. | |
| 2018/0044949 | A1 | 2/2018 | Frello et al. | |
| 2018/0209182 | A1 | 7/2018 | Beck et al. | |
| 2018/0245374 | A1 * | 8/2018 | Arlinghaus | E05B 65/1093 |
| 2018/0245375 | A1 * | 8/2018 | Arlinghaus | E05B 65/1053 |
| 2020/0048935 | A1 * | 2/2020 | Carpenter | E05B 47/0673 |
| 2021/0010294 | A1 * | 1/2021 | Shaffer | G07C 9/00309 |
| 2021/0040775 | A1 * | 2/2021 | Kusanale | H02P 29/028 |

OTHER PUBLICATIONS

Written Opinion of the International Searching Authority; International Searching Authority; International Patent Application No. PCT/US2020/045196; dated Mar. 4, 2021; 8 pages.
Canadian Examination Report; Canadian Intellectual Property Office; Canadian Application No. 3,150,013; dated Mar. 2, 2023; 4 pages.
Australian Examination Report; Australia IP; Australian Patent Application No. 2020325216; dated Apr. 26, 2023; 5 pages.

* cited by examiner

SENSING AND CONTROL OF ACCESS CONTROL DEVICES

TECHNICAL FIELD

The present disclosure generally relates to access control devices, and more particularly but not exclusively relates to methods of ensuring that the access control device adopts a selected or desired state.

BACKGROUND

Certain current approaches to access control suffer from various drawbacks and deficiencies, such as those relating to the sensing of a position of a movable component, and ensuring that the device reaches a selected or desired state when instructed to do so. For example, while certain access control devices attempt to sense the position of a movable component, the switches utilized to sense such positions are often incapable of providing the desired degree of fidelity. Regarding the latter difficulty, many conventional devices will provide power to the actuator for a predetermined period of time thought sufficient to cause the device to adopt its desired state. If there is a blockage, however, the device may not necessarily reach its desired state, and the actuator may draw excessive current in an attempt to move the device past the blockage. For these reasons among others, there remains a need for further improvements in this technological field.

SUMMARY

An exemplary method generally relates to operating an access control device including a motor, a locking member, and a target component operably connected with the locking member. The motor may be operated to drive the locking member in a first direction from an initial position toward a desired position. When the locking member is blocked from moving beyond a blockage position, a target location of the target component is detected. The motor may then be operated to drive the locking member in a second direction opposite the first direction. The motor may then be operated to drive the locking member in the first direction toward the blockage position while monitoring the location of the target component. As the target component reaches the target location, the motor is supplied with a boost current to drive the locking member beyond the blockage position and toward the desired position. Further embodiments, forms, features, and aspects of the present application shall become apparent from the description and figures provided herewith.

DETAILED DESCRIPTION OF ILLUSTRATIVE EMBODIMENTS

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. The directions defined by each axis may be referred to as positive and negative directions, wherein the arrow of the axis indicates the positive direction. In the coordinate system illustrated in FIG. 1, the X-axis defines first and second longitudinal directions, the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Figure 1:
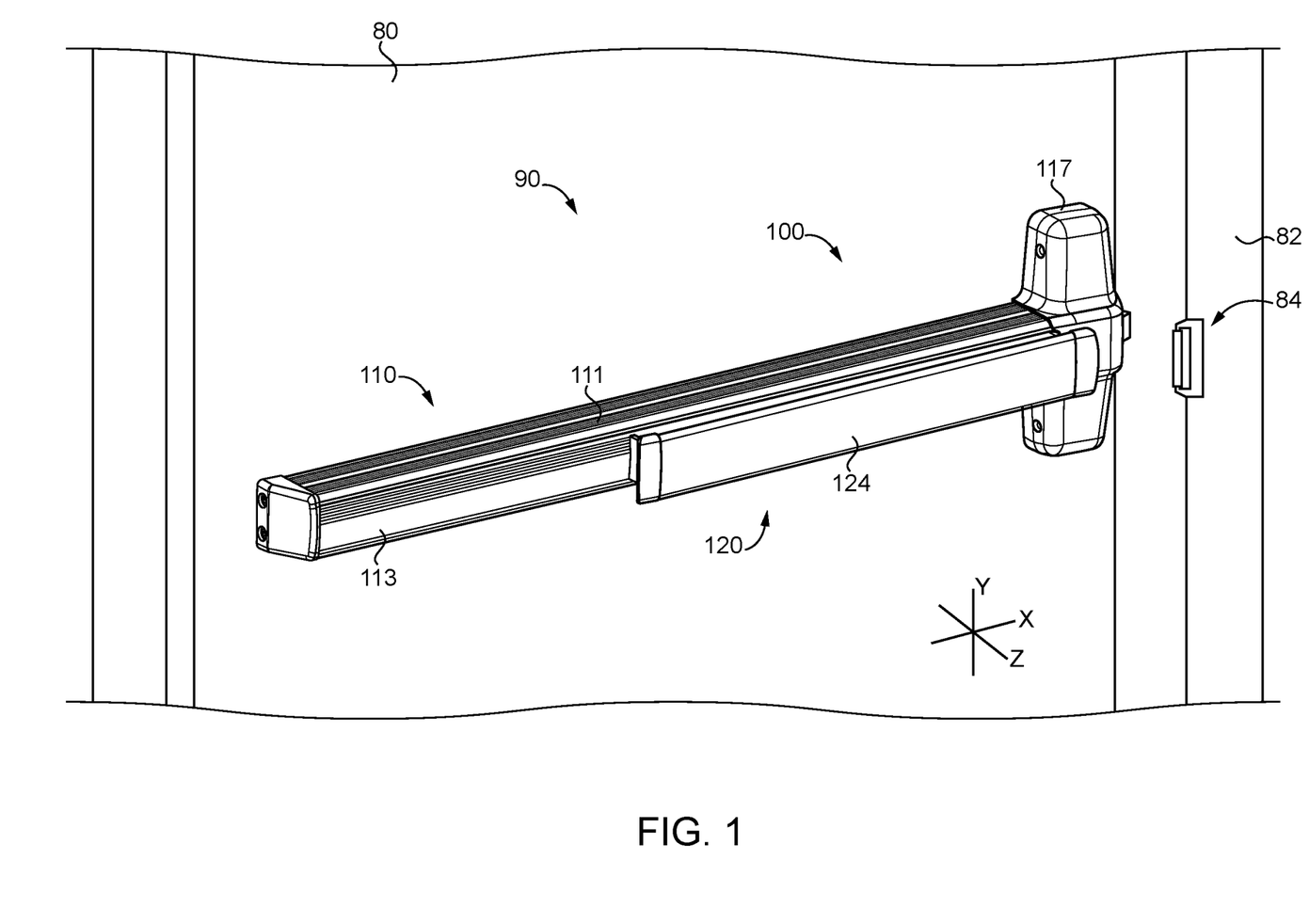
FIG. 1 is a perspective illustration of an exit device according to certain embodiments.
Figure 2:
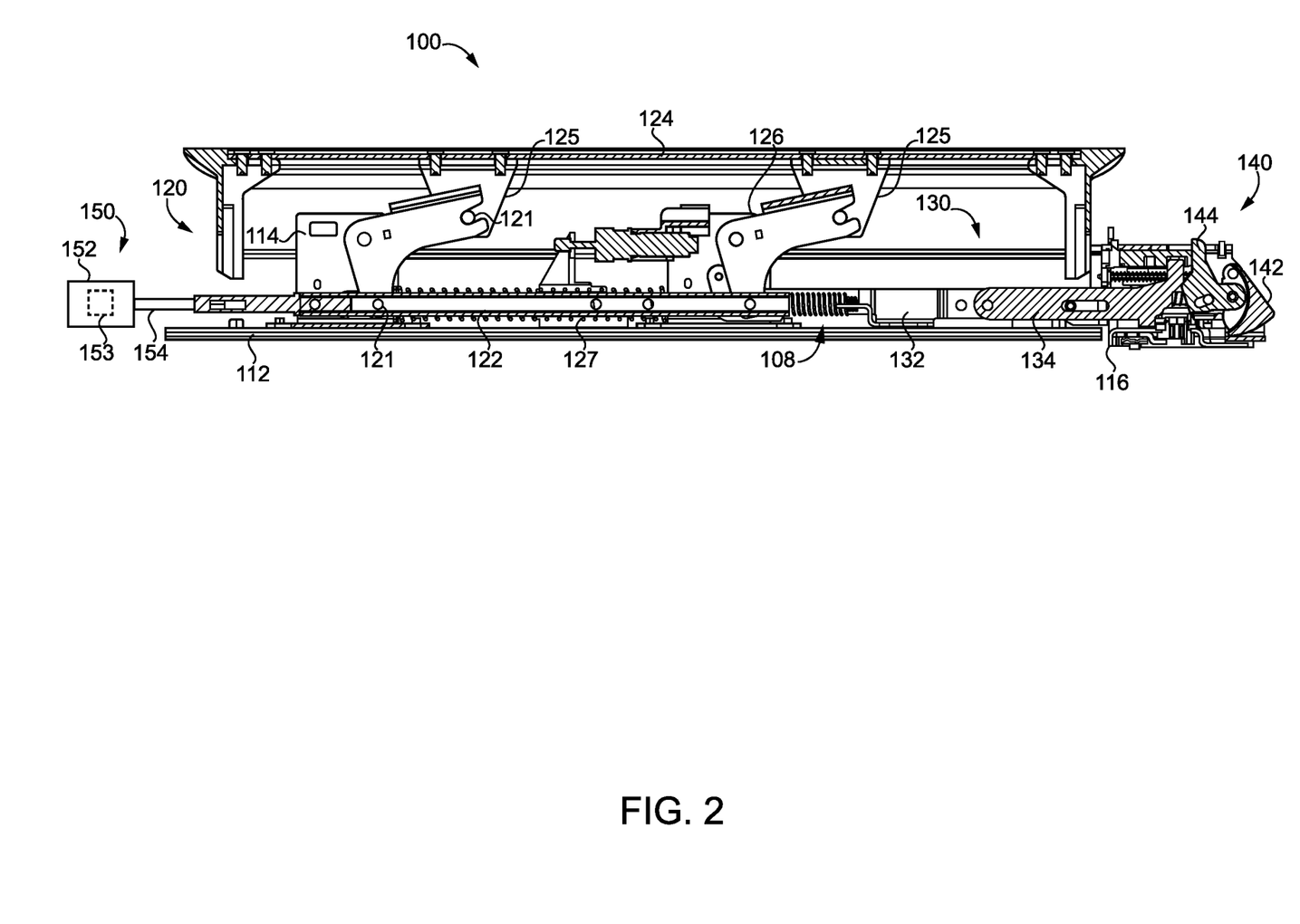
FIG. 2 is a cross-sectional illustration of the exit device illustrated in FIG. 1.

With reference to FIGS. 1 and 2, illustrated therein is an exit device 90 according to certain embodiments. The exit device 90 is configured for mounting to a door 80, and generally includes a pushbar assembly 100 and an electrical actuation assembly 200 operable to actuate the pushbar assembly 100. The pushbar assembly 100 generally includes a mounting assembly 110, a drive assembly 120 movably mounted to the mounting assembly 110 for movement between an actuated state and a deactuated state, a latch control assembly 130 operably coupled with the drive assembly 120 via a lost motion connection 108, a latchbolt mechanism 140 connected with the drive assembly 120 via the latch control assembly 130, and an electromechanical actuator 150 operably coupled with the drive assembly 120.

As described herein, the drive assembly 120 is biased toward the deactuated state, and is operable to be driven to the actuated state when manually actuated by a user or when electrically actuated by the electromechanical actuator 150. The latch control assembly 130 also has an actuated state and a deactuated state, and is operably connected with the drive assembly 120 such that actuation of the drive assembly 120 causes a corresponding actuation of the latch control assembly 130. Additionally, the electromechanical actuator 150 is operable to actuate the drive assembly 120 to retract a latchbolt 142 of the latchbolt mechanism 140 via actuation of the latch control assembly 130.

The mounting assembly 110 generally includes an elongated channel member 111, a base plate 112 mounted in the channel member 111, and a pair of bell crank mounting brackets 114 coupled to the base plate 112. Each of the mounting brackets 114 includes a pair of laterally-spaced walls that extend away from the base plate 112 in the forward direction. The illustrated mounting assembly 110 also includes a faceplate 113 that encloses a distal end portion of the channel member 111, a header plate 116 positioned adjacent a proximal end of the channel member 111, and a header casing 117 mounted to the header plate 116.

The drive assembly 120 includes a drive rod 122 extending along the longitudinal axis 102, a pushbar 124 having a pair of pushbar brackets 125 mounted to the rear side thereof, and a pair of bell cranks 126 operably connecting the drive rod 122 with the pushbar 124. As described herein, the drive rod 122 is mounted for movement in the longitudinal (X) directions, the pushbar 124 is mounted for movement in the transverse (Z) directions, and the bell cranks 126 couple the drive rod 122 and the pushbar 124 for joint movement during actuation and deactuation of the drive assembly 120. Each bell crank 126 is pivotably mounted to a corresponding one of the bell crank mounting brackets 114. Each bell crank 126 includes a first arm pivotably connected to the drive rod 122, and a second arm pivotably connected to a corresponding one of the pushbar brackets 125. The pivotal connections may, for example, be provided by pivot pins 121. The drive assembly 120 further includes a return spring 127 that is engaged with the mounting assembly 110, and which biases the drive assembly 120 toward its deactuated state.

Each of the drive rod 122 and the pushbar 124 has an actuated position in the actuated state of the drive assembly 120, and a deactuated position in the deactuated state of the drive assembly 120. During actuation and deactuation of the drive assembly 120, the drive rod 122 moves in the longitudinal (X) directions between a proximal deactuated position and a distal actuated position, and the pushbar 124 moves in the transverse (Z) directions between a projected or forward deactuated position and a depressed or rearward actuated position. Thus, during actuation of the drive assembly 120, the drive rod 122 moves in the distal ($X^-$) direction, and the pushbar 124 moves in the rearward ($Z^-$) direction. Conversely, during deactuation of the drive assembly 120, the drive rod 122 moves in the proximal ($X^+$) direction, and the pushbar 124 moves in the forward ($Z^+$) direction. The bell cranks 126 translate longitudinal movement of the drive rod 122 to transverse movement of the pushbar 124, and translate transverse movement of the pushbar 124 to longitudinal movement of the drive rod 122.

With the drive assembly 120 in its deactuated state, a user may depress the pushbar 124 to transition the drive assembly 120 to its actuated state. As the pushbar 124 is driven toward its depressed position, the bell cranks 126 translate the rearward movement of the pushbar 124 to distal movement of the drive rod 122, thereby compressing the return spring 127. When the actuating force is subsequently removed from the pushbar 124, the spring 127 returns the drive rod 122 to its proximal position, and the bell cranks 126 translate the proximal movement of the drive rod 122 to forward movement of the pushbar 124, thereby returning the drive assembly 120 to its deactuated state.

The latch control assembly 130 includes a control link 132 and a yoke 134 that is coupled to a retractor 144 of the latchbolt mechanism 140 such that movement of the control link 132 in the distal direction (to the left in FIG. 3) actuates the latchbolt mechanism 140 and retracts the latchbolt 142. The control link 132 is coupled with the drive rod 122 via the lost motion connection 108 such that retraction of the drive rod 122 (i.e., movement of the drive rod from its proximal or extended position to its distal or retracted position) causes a corresponding retraction of the control link 132.

The illustrated latchbolt mechanism 140 includes a pivotally mounted latchbolt 142 and a retractor 144 coupling the latchbolt 142 with the yoke 134. Retraction of the yoke 134 by the control link 132 drives the retractor 144 and retracts the latchbolt 142. Thus, retraction of the drive rod 122 by either the pushbar 124 or the electromechanical actuator 150 serves to actuate the latch control assembly 130 and retract the latchbolt 142. In certain forms, the latchbolt 142 may be referred to as a locking member.

The electromechanical actuator 150 includes a driver 152 operable to extend and retract an output shaft 154 coupled with the drive rod 122 such that the actuator 150 is operable to actuate the drive assembly 120. In the illustrated form, the electromechanical actuator is provided as a linear actuator in which the driver 152 is a rotary motor operable to rotate a rotor 153. The output shaft 154 is threadedly engaged with a rotor 153 such that rotation of the rotor 153 linearly drives the output shaft 154 in the proximal and distal directions, depending upon the direction of the rotation of the rotor 153. In other embodiments, the actuator 150 may be provided as a solenoid in which the driver 152 is an electromagnetic solenoid core that retracts the output shaft when energized.

In the illustrated form, the exit device 90 is provided as a rim-format exit device, in which the latchbolt mechanism 140 is positioned within the header casing 117 and is operable to engage a roller strike 84 mounted to the doorframe 82. It is also contemplated that the exit device 90 may be provided in another format. For example, the exit device 90 may instead be provided in a mortise format, in which a latchbolt mechanism is mounted in a mortise assembly configured for mounting within the door 80. As another example, the exit device 90 may be provided in a vertical format, in which one or more latchbolt mechanisms are mounted above and/or below the header casing 117. Regardless of the precise location of the latchbolt mechanism, actuation of the latch control assembly 130 may nonetheless actuate the latchbolt mechanism to enable opening of the door 80. Furthermore, while the illustrated access control device is provided in the form of an exit device, it is also contemplated that the access control device may take another form, certain illustrative examples of which are provided hereinafter.

Figure 3:
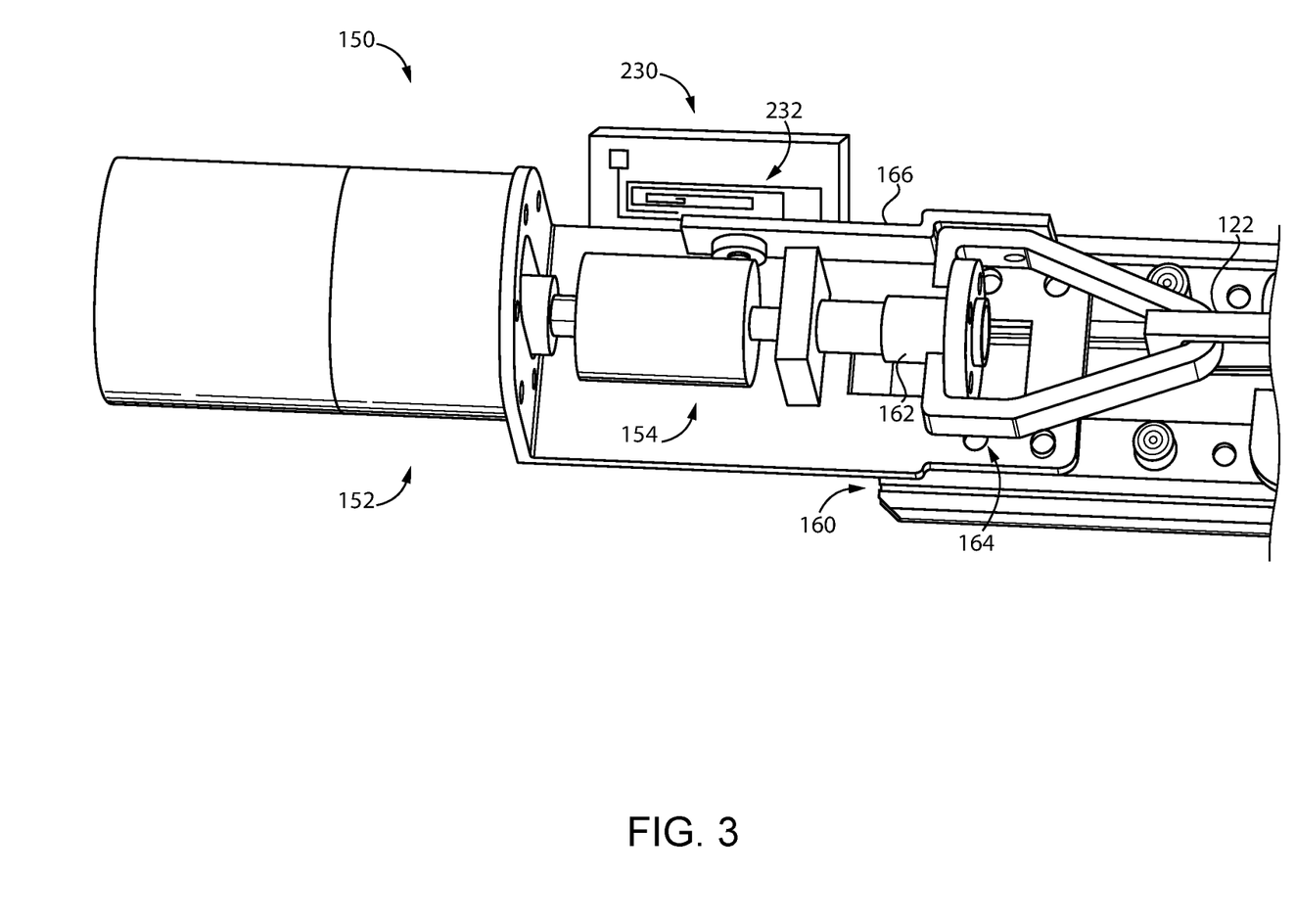
FIG. 3 is a perspective illustration of a portion of the exit device illustrated in FIGS. 1 and 2.

With additional reference to FIG. 3, the output shaft 154 is operably coupled with a driven assembly 160 such that actuation of the actuator 150 drives the driven assembly 160. The driven assembly 160 includes a collar 162 mounted to the motor shaft 154, a coupler 164 engaged between the collar 162 and the drive rod 122, and a target component 166, which in the illustrated form is mounted to the coupler 164. Retraction of the output shaft 154 by the motor 152 retracts the collar 162 and the coupler 164, thereby retracting the drive rod 122, thereby actuating the drive assembly 120, the latch control assembly 130, and the latchbolt mechanism 140, thereby retracting the latchbolt 142. As such, the driven assembly 160 may be considered to further include the drive assembly 120, the latch control assembly 130, and the latchbolt mechanism 140.

Each component of the driven assembly 160 that moves with actuation of the actuator 150 may be referred to as a movable component of the driven assembly 160. While the illustrated target component 166 is mounted to the coupler 164, it is also contemplated that the target component 166 may be mounted to another movable component of the driven assembly 160, or may be provided as such a movable component of the driven assembly 160. Additionally, the driven assembly 160 may include a locking member 168, such as the latchbolt 142. In other forms, the locking member 168 may take another form.

Figure 4:
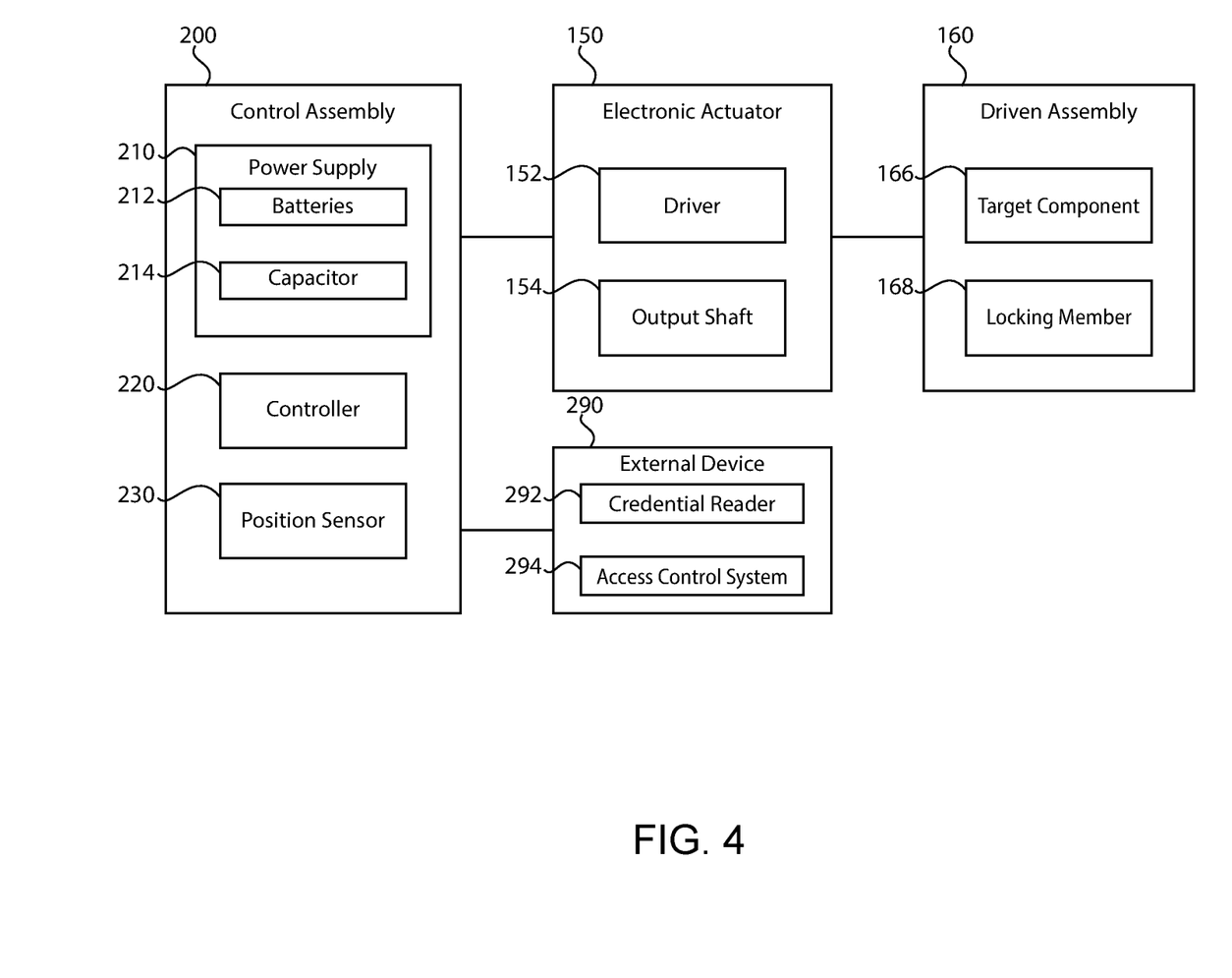
FIG. 4 is a schematic block diagram of an access control device according to certain embodiments.

With additional reference to FIG. 4, the electronic actuator 150 is in communication with a control assembly 200. The control assembly 200 generally includes a power supply 210, a controller 220, and a position sensor 230. The control assembly 200 may be in communication with an external device 290, for example via a wired or wireless communication connection.

In the illustrated form, the power supply 210 is provided as an onboard power supply installed to the exit device 90. The illustrated power supply 210 includes one or more batteries 212 and/or one or more capacitors 214. In other forms, the power supply 210 may comprise line power, in which case the batteries 212 may be omitted. As described herein, the power supply 210 is operable to supply power to the electromechanical actuator 150, the controller 220, and the position sensor 230.

The controller 220 is powered by the power supply 210, is in communication with the position sensor 230, and is configured to control operation of the electromechanical actuator 150. Further details regarding such communication and control are provided herein.

The position sensor 230 is associated with the target component 166 such that the position sensor 230 is operable to sense the position of the target component 166, and to output information relating to the sensed position of the target component. In the illustrated form, the target component 166 is provided as an electrically conductive target component, and the position sensor 230 is provided as a linear inductive position sensor including a plurality of coils 232. When active, the sensor 230 is provided with an alternating current such that the coils 232 generate a magnetic field. The generated magnetic field induces eddy currents in the electrically conductive target component 166, which affects the magnetic field generated by the coils and alters the output signal of the sensor 230. As will be appreciated, the output of the sensor 230 varies as the inductive target component 166 traverses the coils 232 such that the output of the sensor is correlated with the absolute position of the inductive target component 166. Thus, in contrast to switches, which provide a binary indication of the position of a target component, the inductive sensor 230 is operable to generate a signal indicative of the precise location of the target component 166 within a range of available positions. As described herein, this feature may provide for advantages in certain embodiments.

In the illustrated form, the sensor 230 is provided as an inductive position sensor, and is associated with an electrically conductive target component 166. It is also contemplated that the sensor 230 may be provided in another form. For example, the sensor 230 may instead be provided as a Hall effect sensor, and the target component 166 may be provided as a magnet mounted to or integrally formed with a movable component of the driven assembly 160.

The external device 290 may be provided as a credential reader 292 and/or an access control system 294, each of which may be operable to provide the control assembly 200 with commands related to the operation of the electronic actuator 150. For example, the credential reader 292 and/or the access control system may issue an unlock command to the control system 200, and the controller 220 may cause the electromechanical actuator 150 to retract the latchbolt 142 in response to the unlock command.

When operating the actuator 150, the control system 200 may limit the current drawn by the actuator 150 to a threshold limit. While limiting of the current drawn limits the force that the actuator 150 is operable to exert on the driven assembly 160, such limiting can also aid in preserve the life and health of the batteries 212. In certain circumstances, it may be the case that the limited force available to the actuator 150 is insufficient to drive the locking member 168 from a start position to a desired position, such as when a blockage prevents the locking member 168 from moving beyond a blockage position. For example, if a user is holding the pushbar 124 in its extended position in an attempt to tamper with operation of the exit device 90, the actuator 150 may initially be unable to actuate the drive assembly 120 to retract the latchbolt 142. In such circumstances, the control assembly 200 may perform a blockage overcoming operation such as those described herein.

Figure 5:
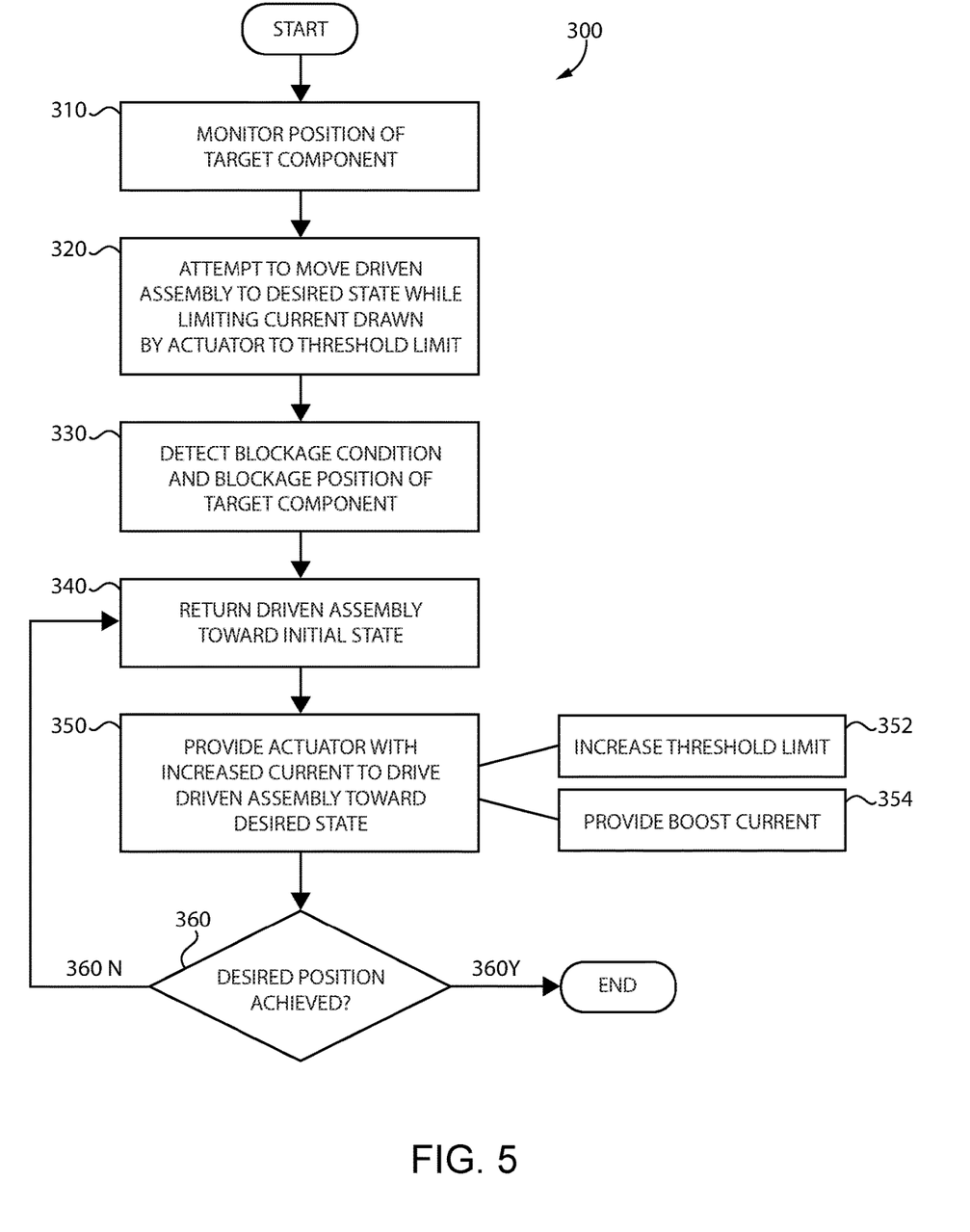
FIG. 5 is a schematic flow diagram of a process according to certain embodiments.

With additional reference to FIG. 5, illustrated therein is a process 300 according to certain embodiments. While the process 300 may be performed using the exit device 90 described above, it is also contemplated that the process 300 may be performed using access control devices of other types, such as those of the types illustrated in FIGS. 6 and 7. Thus, while certain aspects of the process 300 are described herein with specific reference to the exit device 90, it is to be appreciated that descriptions may also be applicable when the process 300 is utilized in connection with access control devices of other forms.

Operations illustrated for the processes in the present application are understood to be examples only, and operations may be combined or divided, and added or removed, as well as re-ordered in whole or in part, unless explicitly stated to the contrary. Unless specified to the contrary, it is contemplated that certain operations or steps performed in the process 300 may be performed wholly by the control assembly 200, or that the operations or steps may be distributed among one or more of the elements and/or additional devices or systems that are not specifically illustrated in FIGS. 1-4. Furthermore, while the operations are illustrated in a relatively serial fashion, it is to be appreciated that certain operations may be performed in parallel or concurrently with one another.

The process 300 includes an operation 310, which generally involves monitoring the position of the target component 166. Each component of the driven assembly 160 may begin the process 300 in a corresponding and respective start position, and may end the process 300 in a corresponding and respective desired position. Should a blockage arise during the performance of the process 300, each component of the driven assembly 160 may be temporarily blocked at a corresponding and respective blockage position located between its start position and its desired position. Thus, the driven assembly 160 may be considered to have a start state, a blocked state, and a desired state, which respectively include the start positions, the blockage positions, and the desired positions of the movable components of the driven assembly 160. In various forms, the operation 310 may be performed continually, continuously, or intermittently throughout the performance of the process 300.

The process 300 also includes an initial attempt operation 320, which generally involves operating the actuator 150 in a first manner in an initial attempt to move the locking member 168 from its start position to its desired position. For example, in response to a valid credential being presented to the credential reader 292, the controller 220 may activate the actuator 150 in an attempt to move the latchbolt 142 from its extended position to its retracted position. The operation 320 generally involves supplying a first current to the actuator 150 while limiting the current drawn by the actuator 150 to a threshold limit having a first value. Such actuation causes the driven assembly 160 and the movable components thereof (including the locking member 168 and the target component 166) to move in a first direction from their start positions toward their desired positions.

The process 300 further includes an operation 330, which generally involves detecting a blockage condition that prevents the driven assembly 160 from reaching its desired state. In certain forms, the operation 330 may involve detecting that the actuator 150 is attempting to draw a current in excess of the threshold limit. In certain forms, the operation 330 may involve detecting, via the sensor 230, that the target component 166 has stalled before reaching its desired position. The operation 330 further involves detecting, via the sensor 230, a blockage position for the target component 166. This blockage position and/or the sensor output corresponding to the blockage position is saved in memory for future reference.

Upon detecting the blockage condition and noting the blockage position for the target component 166, the process 300 continues to an operation 340. The operation 340 generally involves operating the actuator 150 in a second manner that causes the driven assembly 160 to return toward its start position by traveling in a second direction opposite the first direction. In certain embodiments, operating the actuator 150 in the second manner involves providing the actuator with a second current. The second current may have a nonzero value such that the actuator 150 positively drives at least a portion of the driven assembly 160 toward its start state. It is also contemplated that the second current may be of a zero value. For example, in embodiments in which the driven assembly 160 is biased toward its start state, the biasing forces may back-drive the motor 152 while returning the driven assembly 160 toward its start state. In certain embodiments, the operation 340 may involve causing the driven assembly 160 to return to its start state, while in other forms the operation 340 may involve only allowing the driven assembly 160 to return to an intermittent state between the start state and the blockage state.

After allowing the driven assembly 160 to approach or reach its start state, the process 300 may continue to an operation 350. The operation 350 generally involves operating the actuator 150 in a third manner that causes the driven assembly 160 to again travel in the first direction, which is toward the blockage state and the desired state. The operation 350 may involve a block 352 and/or a block 354, each of which generally involves supplying the actuator 150 with a current in excess of the initial threshold limit as the driven assembly 160 approaches its blockage state.

In certain forms, the operation 350 involves block 352, which generally involves increasing the threshold limit from a first value to a second value greater than the first value as the driven assembly 160 approaches the blockage state. In such forms, the driver 152 may draw a greater current from the batteries 212, thereby increasing the force with which the driver 150 urges the driven assembly 160 toward its desired state.

In certain forms, the operation 350 involves block 354, which generally involves providing the driver 152 with a boost current as the driven assembly 160 approaches its blockage state. In such embodiments, the process 300 may further involve storing electrical power in the capacitor 214, and discharging the stored electrical power to the driver 152 as the driven assembly 160 approaches its blockage state.

As noted above, the blockage state of the driven assembly 160 corresponds to the blockage position of each movable component, including the target component 166. Thus, by monitoring the position of the target component 166 with the sensor 230, it is possible to provide the current in excess of the initial threshold limit as the driven assembly 160 approaches its blockage state. In certain forms, the controller 220 may derive a threshold position between the start position and the blockage position of the target component 166, and may perform the operation 350 to provide the increased current when the output from the sensor 230 indicates that the target component 166 has reached the threshold position. In certain forms, the controller 220 may perform the operation 350 to provide the increased current when the target component 166 reaches the blockage position. Thus, in certain embodiments, the controller 220 may first operate the actuator 150 with the first current limit until the target component 166 reaches the threshold position or the blockage position, and subsequently perform the operation 350 to provide the actuator 150 with the increased current.

In certain circumstances, the increased current provided in the operation 350 may be sufficient to overcome the blockage. The process 300 may include block 360, which generally involves evaluating the information received from the sensor 230 to determine whether the target component 166 has reached its desired position, which would indicate that the locking member 168 has likewise reached its desired position. When the information from the sensor 230 indicates that the target component 166 has reached its desired position, block 360 results in a positive result 360Y, and the process 300 may terminate. When the information from the sensor 230 indicates that the target component 166 has not reached its desired position, block 360 results in a negative result 360N.

In response to the negative result 360N, the process 300 may return to the operation 340 to return the driven assembly 160 toward its start state, followed by an additional iteration of the operation 350. The additional iteration of the operation 350 may involve providing the actuator 150 with a further increased current greater than the increased current provided in the prior iteration of the operation 350. For example, the additional iteration of the operation 350 may involve increasing the threshold limit to a value greater than the value of the threshold limit in the prior iteration of the operation 350, thereby permitting the motor 152 to drawn an even greater current from the batteries 212.

In the illustrated embodiment, the process 300 involves first moving the driven assembly 160 away from the blockage position and toward its start position in operation 340 before supplying the actuator 150 with the increased current in operation 350. This allows the driven assembly to build up momentum as the driven assembly 160 approaches the blockage state. In addition to the increased current provided to the actuator 150, this momentum may aid in overcoming the blockage to a greater extent than if the operation 340 were omitted and the increased current were provided without first backing the driven assembly toward its start state.

Figure 6:
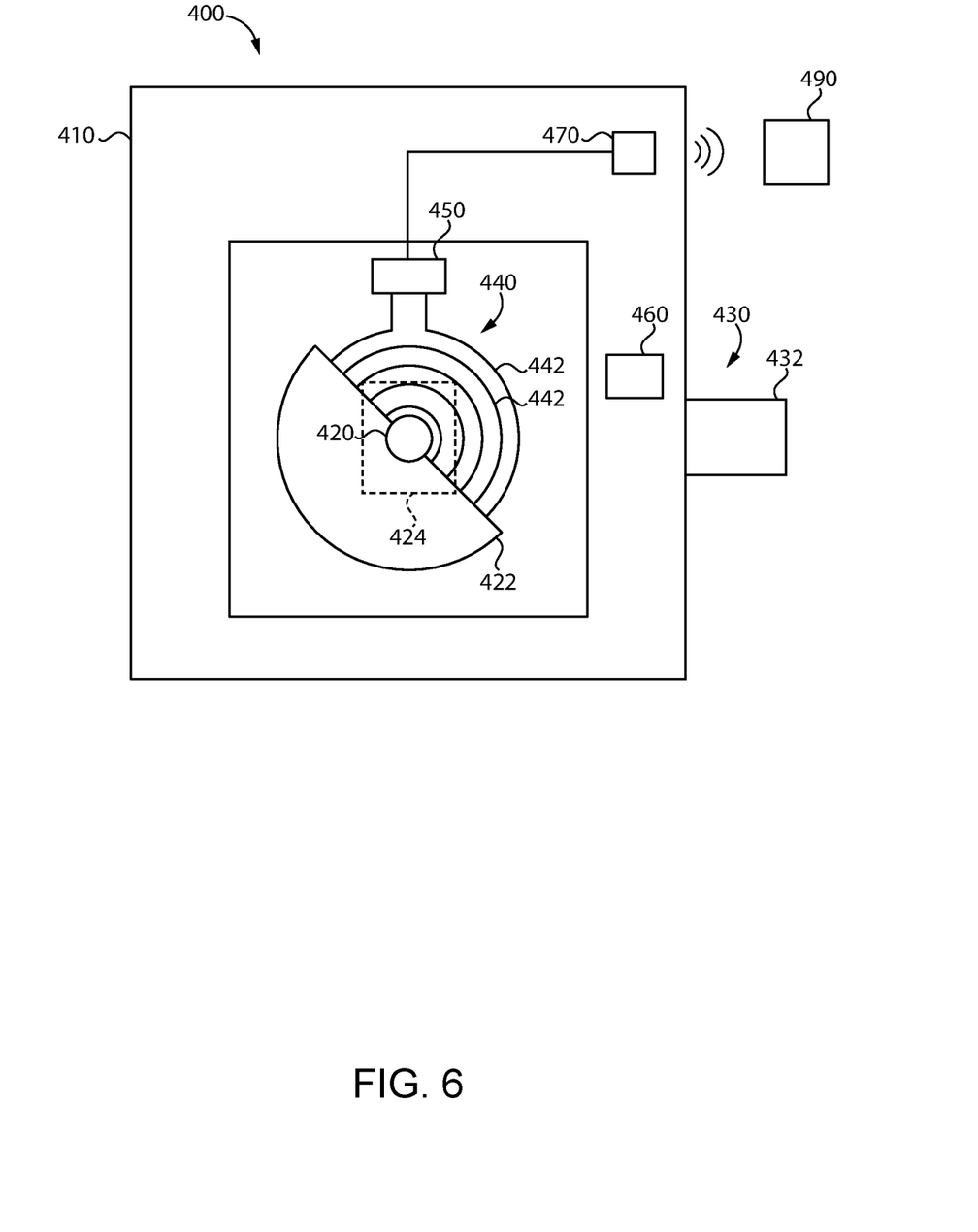
FIG. 6 is a schematic representation of an access control device according to certain embodiments.

With reference to FIG. 6, illustrated therein is a portion of another embodiment of an access control device 400. The access control device 400 generally includes a housing 410, a spindle 420 rotatably mounted to the housing 410, a bolt mechanism 430 operably connected with the spindle 420, an inductive rotary position sensor 440 mounted to the housing 410 and associated with the spindle 420, and a controller 450 in communication with the sensor 440. The access control device 400 may further include an electromechanical actuator 460 operable to actuate the bolt mechanism 430, for example by rotating the spindle 420.

The spindle 420 is rotatably mounted to the housing 410, and includes an inductive target component 422 mounted thereon and within the housing 410. Mounted to an end of the spindle 420 and outside the housing 410 is a manual actuator 424 by which the spindle 420 can be rotated to actuate the bolt mechanism 430. The bolt mechanism 430 includes a locking member in the form of a bolt 432 having an extended position and a retracted position. The bolt mechanism 430 is engaged with the spindle 420 such that rotation of the spindle 420 extends and retracts the bolt 432.

In certain forms, the bolt mechanism 430 may be provided in the form of a latchbolt mechanism in which the bolt 432 is provided as a latchbolt. In such forms, the manual actuator 424 may be provided as a handle such as a knob or lever, and the handle and the latchbolt may be biased toward home positions. For example, the latchbolt may be biased toward an extended position by a spring of the bolt mechanism 430, and the handle may be biased toward a corresponding home position by a spring cage. In other forms, the bolt mechanism 430 may be provided in the form of a deadbolt mechanism in which the bolt 432 is provided as a deadbolt. In such forms, the manual actuator 424 may be provided as a thumbturn, and the thumbturn and the deadbolt may not necessarily be biased toward home positions.

The inductive rotary position sensor 440 is associated with the inductive target component 422. The sensor 440 includes a plurality of coils 442, portions of which are covered by the target component 422. The coils 442 are arranged such that the sensor 440 is operable to sense the absolute rotational position of the target component 422. As a result, the sensor 440 is operable to detect the rotational position of the spindle 420 and to output information relating to the same.

The controller 450 is in communication with the sensor 440 and is operable to determine the rotational position of the spindle 420 based upon the information output by the sensor 440. In the illustrated form, the controller 450 is further in communication with the electromechanical actuator 460, and is operable to control operation of the electromechanical actuator 460 along the lines set forth above.

As noted above, the manual actuator 424 may be provided in the form of a lever handle. Such lever handles are typically biased toward a home position in which the lever is substantially horizontal. One issue that can arise with such lever handles is a droop condition, in which the lever fails to return to its fully horizontal position, and instead droops toward the ground. In the illustrated form, the controller 450 is able to detect the droop condition based upon the information received from the inductive rotary position sensor 440. Due to the fact that the sensor 440 detects the absolute rotary position of the spindle 420, the controller 450 is able to distinguish between a state in which the lever is fully horizontal and one in which the lever is drooping. Upon detection of a droop condition, the controller 450 may log the droop condition and/or report the droop condition to an external device 490, for example via a wireless communication device 470.

In certain embodiments, the bolt mechanism 430 may be provided in the form of a deadbolt mechanism in which the bolt 432 is not biased to either of its extended or retracted positions. Due to the fact that the rotational position of the spindle 420 corresponds to the position of the bolt 432, the absolute position of the bolt 432 can be detected based upon the rotational position of the spindle 420.

Figure 7:
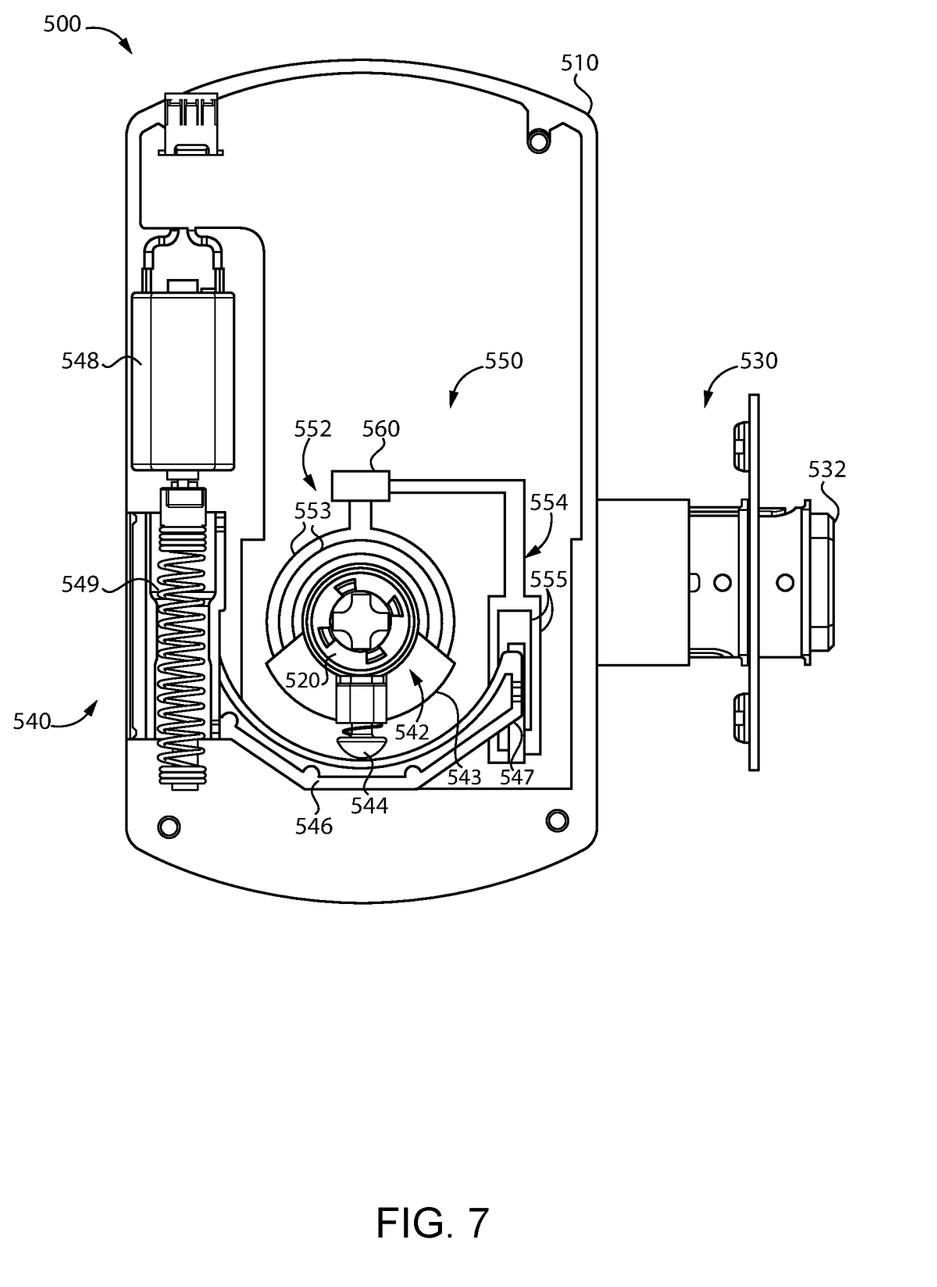
FIG. 7 is a plan view of an access control device according to certain embodiments.

With reference to FIG. 7, illustrated therein is an access control device in the form of a deadbolt assembly 500. The deadbolt assembly 500 generally includes a housing 510, a spindle 520 rotatably mounted to the housing 510, a deadbolt mechanism 530, a clutch assembly 540 selectively coupling the deadbolt mechanism 530 with the spindle 520, a sensor assembly 550 associated with the clutch assembly 540, and a controller 560 in communication with the clutch assembly 540 and the sensor assembly 550.

In the illustrated form, the spindle 520 is coupled with a thumbturn, and is selectively connected with the deadbolt mechanism 530 via the clutch assembly 540. The clutch assembly 540 includes an adapter 542 operably coupled with the deadbolt mechanism, a locking member in the form of a pin 544 operable to couple the adapter 542 with the spindle 520, a movable wall 546 operable to move the pin 544 between a coupling position and a decoupling position, and a motor 548 operable to drive the wall 546 upward and downward. The motor 548 is engaged with the wall 546 via a spring 549 such that rotation of the spring 549 urges the wall 546 between an upper position and a lowed position. In the upper position, the wall 546 places the pin 544 in the coupling position, in which the pin 544 extends into a notch formed in the spindle 520 to rotationally couple the spindle 520 with the adapter 542, thereby enabling the thumbturn to drive the deadbolt 532 between its extended and retracted positions. In the lower position, the wall 546 allows the pin 544 to move to its decoupling position, in which the pin 544 decouples the spindle 520 from the adapter 542 such that the thumbturn is not operable to drive the deadbolt 532 between its extended and retracted positions.

The sensor assembly 550 includes a first sensor 552 including first coils 553 and a second sensor 554 including second coils 555. The first sensor 552 is an inductive rotational position sensor, and is associated with a first target component 543 coupled with the adapter 542 such that the first sensor 552 is operable to sense the rotational position of the adapter 542. As a result, the controller 560 is able to determine the absolute position of the deadbolt 532 based upon the output from the first sensor 552. The second sensor is an inductive linear position sensor, and is associated with a second target component 547 defined by the movable wall 546 such that the second sensor is operable to sense the linear position of the wall 546. As a result, the controller 560 is able to determine the absolute position of the wall 546 based upon the output from the second sensor 554.

In the illustrated form, the motor 548 is connected to the movable wall 546 via the spring 549. When the wall 546 is blocked from moving to its desired position, the spring 549 stores mechanical energy that is released when the wall 546 becomes free to move to its desired position. However, it is also possible that the above-described process 300 may obviate the spring 549 by facilitating movement of the wall 546 to its desired position when the wall 546 is initially blocked from doing so. As such, it is contemplated that in certain embodiments, the motor 548 may be provided as a linear actuator, the output shaft of which is rigidly engaged with the wall 546.

There exist certain existing systems in which a motor is operably engaged with a locking member via a spring in a manner similar to that illustrated in FIG. 7. However, systems of this type typically run the motor for a predetermined period of time intended to be sufficient to move the locking member to its desired position, and report that the locking member is in the desired position once the motor has been run for the predetermined period of time. However, it may be the case that the locking member has not yet reached the desired position, and that the mechanical energy has instead been stored in the spring due to the locking member being blocked from reaching its desired position. Such shortcomings may be addressed by the embodiments described herein, for example by waiting to transmit the signal that the pin 544 has reached its desired position until the second sensor 544 indicates that the moving wall has reached the corresponding desired position.

As should be evident from the foregoing, the present disclosure sets forth, among other concepts and features, inductive sensing of a target component in an access control device. The target component may be operably connected with a locking member of the access control device and/or a manual actuator of the access control device. While certain existing access control devices include mechanical contact switches that provide binary indications relating to the position of a movable component, the absolute position sensing provided by the subject disclosure may provide certain advantages not afforded by the prior art.

As one example, in contrast to existing contact sensors, the inductive position sensors of the illustrated embodiments do not require contact with the associated target component, and are instead provided as contactless position sensors. This reduces wear on the sensor and the target components, and increases the reliability of the sensed position. Additionally, unlike Hall effect sensors, inductive position sensors are immune to stray magnetic fields.

Additionally, the information provided by the sensors of the subject disclosure can be used in many applications, such as smart home or smart installation solutions. By way of illustration, the information can be analyzed for predictive maintenance and/or smart home solutions, such as when the information is wirelessly communicated to a cloud or a smart home hub, such as within an Internet of Things environment. As one example, the detection of a droop condition may indicate that maintenance is needed. As another example, the detection of a blockage condition may indicate that door warpage or tampering has occurred, and that inspection and/or maintenance is warranted. In certain forms, the control assembly may cause continuous streaming of information relating to the position of the target component, thereby enabling real-time analytics relating to the operation of the access control device.

Figure 8:
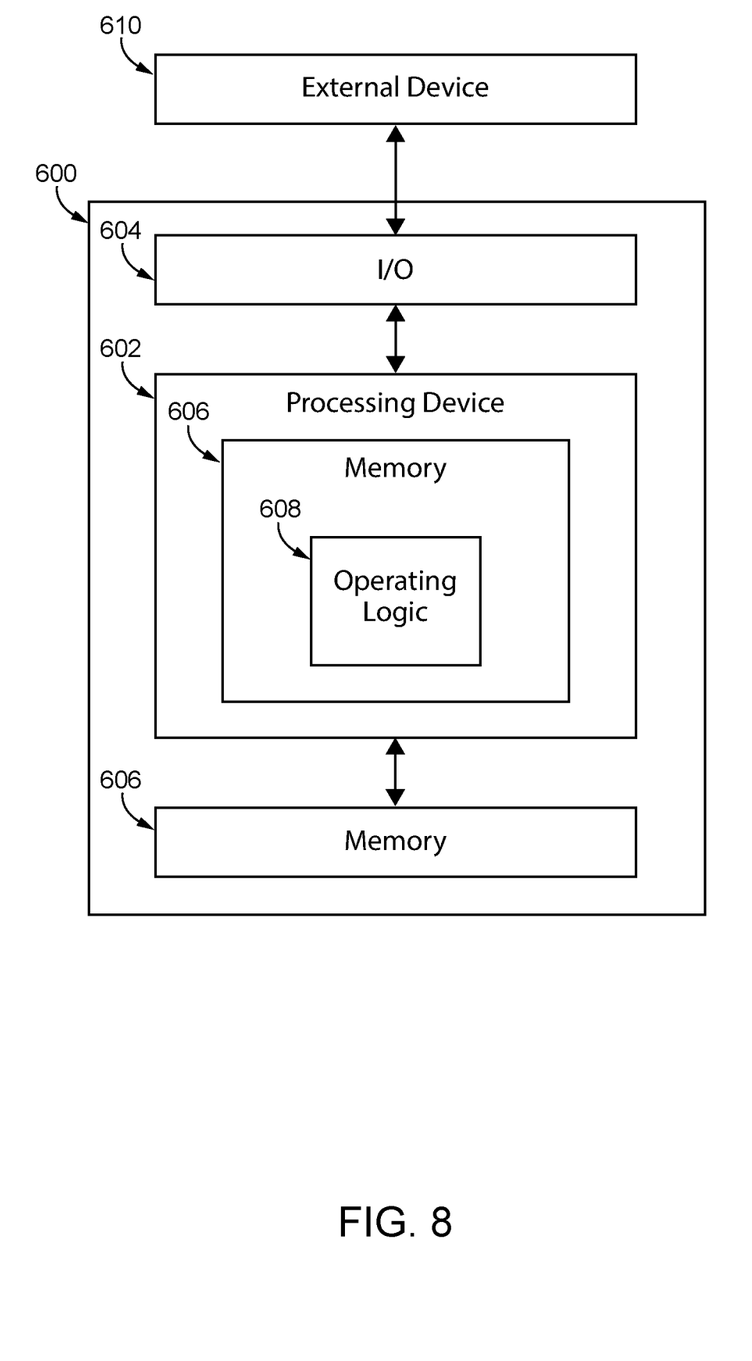
FIG. 8 is a schematic block diagram of a computing device that may be utilized in certain embodiments.

Referring now to FIG. 8, a simplified block diagram of at least one embodiment of a computing device 600 is shown. The illustrative computing device 600 depicts at least one embodiment of a controller that may be utilized in connection with the access control devices illustrated in FIGS. 1-4, 6, and 7.

Depending on the particular embodiment, the computing device 600 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 600 includes a processing device 602 that executes algorithms and/or processes data in accordance with operating logic 608, an input/output device 604 that enables communication between the computing device 600 and one or more external devices 610, and memory 606 which stores, for example, data received from the external device 610 via the input/output device 604.

The input/output device 604 allows the computing device 600 to communicate with the external device 610. For example, the input/output device 604 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 600. The input/output device 604 may include hardware, software, and/or firmware suitable for performing the techniques described herein.

The external device 610 may be any type of device that allows data to be inputted or outputted from the computing device 600. For example, in various embodiments, the external device 610 may be embodied as an access control device, a credential reader, a sensor, or another of the electronic components illustrated in the foregoing Figures. Further, in some embodiments, the external device 610 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 610 may be integrated into the computing device 600.

The processing device 602 may be embodied as any type of processor(s) capable of performing the functions described herein. In particular, the processing device 602 may be embodied as one or more single or multi-core processors, microcontrollers, or other processor or processing/controlling circuits. For example, in some embodiments, the processing device 602 may include or be embodied as an arithmetic logic unit (ALU), central processing unit (CPU), digital signal processor (DSP), and/or another suitable processor(s). The processing device 602 may be a programmable type, a dedicated hardwired state machine, or a combination thereof. Processing devices 602 with multiple processing units may utilize distributed, pipelined, and/or parallel processing in various embodiments. Further, the processing device 602 may be dedicated to performance of just the operations described herein, or may be utilized in one or more additional applications. In the illustrative embodiment, the processing device 602 is of a programmable variety that executes algorithms and/or processes data in accordance with operating logic 608 as defined by programming instructions (such as software or firmware) stored in memory 606. Additionally or alternatively, the operating logic 608 for processing device 602 may be at least partially defined by hardwired logic or other hardware. Further, the processing device 602 may include one or more components of any type suitable to process the signals received from input/output device 604 or from other components or devices and to provide desired output signals. Such components may include digital circuitry, analog circuitry, or a combination thereof.

The memory 606 may be of one or more types of non-transitory computer-readable media, such as a solid-state memory, electromagnetic memory, optical memory, or a combination thereof. Furthermore, the memory 606 may be volatile and/or nonvolatile and, in some embodiments, some or all of the memory 606 may be of a portable variety, such as a disk, tape, memory stick, cartridge, and/or other suitable portable memory. In operation, the memory 606 may store various data and software used during operation of the computing device 600 such as operating systems, applications, programs, libraries, and drivers. It should be appreciated that the memory 606 may store data that is manipulated by the operating logic 608 of processing device 602, such as, for example, data representative of signals received from and/or sent to the input/output device 604 in addition to or in lieu of storing programming instructions defining operating logic 608. As illustrated, the memory 606 may be included with the processing device 602 and/or coupled to the processing device 602 depending on the particular embodiment. For example, in some embodiments, the processing device 602, the memory 606, and/or other components of the computing device 600 may form a portion of a system-on-a-chip (SoC) and be incorporated on a single integrated circuit chip.

In some embodiments, various components of the computing device 600 (e.g., the processing device 602 and the memory 606) may be communicatively coupled via an input/output subsystem, which may be embodied as circuitry and/or components to facilitate input/output operations with the processing device 602, the memory 606, and other components of the computing device 600. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 600 may include other or additional components, such as those commonly found in a typical computing device (e.g., various input/output devices and/or other components), in other embodiments. It should be further appreciated that one or more of the components of the computing device 600 described herein may be distributed across multiple computing devices. In other words, the techniques described herein may be employed by a computing system that includes one or more computing devices. Additionally, although only a single processing device 602, I/O device 604, and memory 606 are illustratively shown in FIG. 8, it should be appreciated that a particular computing device 600 may include multiple processing devices 602, I/O devices 604, and/or memories 606 in other embodiments. Further, in some embodiments, more than one external device 610 may be in communication with the computing device 600.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of operating an access control device including a lock component and an electromechanical actuator operably connected with the lock component, wherein the lock component has a first position and a second position, wherein one of the first position or the second position corresponds to a locked state of the access control device, and wherein the other of the first position or the second position corresponds to an unlocked state of the access control device, the method comprising:

operating the electromechanical actuator in a first manner to drive the lock component from the first position toward the second position, wherein operating the electromechanical actuator in the first manner includes limiting a current drawn by the electromechanical actuator to a first threshold limit;

detecting a blockage preventing the lock component from moving in a first direction beyond a blockage position located between the first position and the second position;

in response to detecting the blockage of the lock component, operating the electromechanical actuator in a second manner to thereby cause movement of the lock component in a second direction opposite the first direction, thereby causing the lock component to move from the blockage position toward the first position; and operating the electromechanical actuator in a third manner to drive the lock component in the first direction and toward the blockage position, wherein operating the electromechanical actuator in the third manner comprises providing the electromechanical actuator with an increased current greater than the first threshold limit, thereby increasing a force exerted on the lock component as the lock component approaches the blockage position such that the lock component passes beyond the blockage position.

2. The method of claim 1, wherein providing the electromechanical actuator with the increased current comprises limiting the current drawn by the electromechanical actuator to a second threshold limit greater than the first threshold limit.

3. The method of claim 1, wherein providing the electromechanical actuator with the increased current comprises providing the electromechanical actuator with a boost current derived from electrical power stored in a capacitor.

4. The method of claim 1, wherein the first position corresponds to the locked state;
wherein the second position corresponds to the unlocked state; and
wherein the operating the electromechanical actuator in the first manner is performed in response to presentation of a valid credential to a credential reader of the access control device.

5. The method of claim 1, wherein the electromechanical actuator comprises a rotary motor having an output shaft that is driven linearly by rotation of a rotor of the motor; and
wherein the output shaft is operably connected with the lock component.

6. The method of claim 1, wherein detecting a blockage of the lock component comprises:
monitoring a position of a target component; and
determining the blockage exists in response to the target component failing to move beyond a target component blockage position.

7. The method of claim 6, wherein operating the electromechanical actuator in the third manner comprises providing the electromechanical actuator with an increased current greater than the first threshold limit as the target component approaches the blockage position.

8. The method of claim 1, wherein the access control device comprises a driven assembly comprising the lock component;
wherein the driven assembly further comprises an electrically conductive target component;
wherein the method further comprises determining a target component blockage position of the target component in response to detecting the blockage of the lock component; and
wherein determining the target component blockage position comprises sensing the target component blockage position via an inductive sensor associated with the target component.

9. A method of operating an access control device comprising a lock component operable to move in each of a first direction and a second direction opposite the first direction, and an electromechanical actuator operable to move the lock component, the method comprising:

operating the electromechanical actuator in a first manner, thereby driving the lock component in the first direction, wherein operating the electromechanical actuator in the first manner comprises supplying the electromechanical actuator with a first current;

detecting a blockage that blocks the lock component from moving in the first direction beyond a blockage position;

moving the lock component in the second direction and away from the blockage position; and operating the electromechanical actuator in a second manner to thereby drive the lock component in the first direction, wherein operating the electromechanical actuator in the second manner comprises supplying the electromechanical actuator with a second current greater than the first current, and wherein the second current is sufficient to overcome the blockage such that operating the electromechanical actuator in the second manner results in the lock component being driven past the blockage position.

10. The method of claim 9, further comprising monitoring the position of a target component connected with the lock component;
wherein detecting the blockage comprises detecting a stoppage of the target component.

11. The method of claim 10, wherein monitoring the position of the target component comprises monitoring the position of the target component via an inductive position sensor.

12. The method of claim 10, further comprising detecting a target component blockage position in response to detecting the stoppage of the target component;
wherein supplying the electromechanical actuator with the second current comprises supplying the electromechanical actuator with the second current as the target component approaches the target component blockage position.

13. The method of claim 9, wherein moving the lock component in the second direction comprises operating the electromechanical actuator in a third manner.

14. The method of claim 13, further comprising biasing the lock component in the second direction;
wherein operating the electromechanical actuator in the third manner comprises permitting the lock component to move in the second direction as a result of the biasing.

15. A method of overcoming a blockage in an access control device comprising a lock component operable to move in each of a first direction and a second direction opposite the first direction, and an electromechanical actuator operable to move the lock component, the method comprising:
- moving the lock component in the first direction with a first force until the lock component reaches a blockage position, wherein moving the lock component in the first direction with the first force comprises operating the electromechanical actuator in a first manner to thereby generate the first force;
- in response to the lock component reaching the blockage position, moving the lock component in the second direction; and
- moving the lock component in the first direction with a second force such that the lock component moves beyond the blockage position, wherein moving the lock component in the first direction with the second force comprises operating the electromechanical actuator in a second manner to thereby generate the second force, and wherein the second force is greater than the first force.

16. The method of claim 15, wherein moving the lock component in the second direction comprises operating the electromechanical actuator in a third manner.

17. The method of claim 16, further comprising biasing the lock component in the second direction;
- wherein operating the electromechanical actuator in the third manner comprises permitting the lock component to move in the second direction as a result of the biasing.

18. The method of claim 15, further comprising monitoring the position of a target component connected with the lock component;
- wherein detecting the blockage comprises detecting a stoppage of the target component.

19. The method of claim 18, wherein monitoring the position of the target component comprises monitoring the position of the target component via an inductive position sensor.

* * * * *